E. HUSON.
Assignor by mesne assignments to J. DODDS, J. W. STODDARD and JOHN DODDS & CO.
HORSE HAY-RAKE.
No. 7,447. Reissued Dec. 26, 1876.
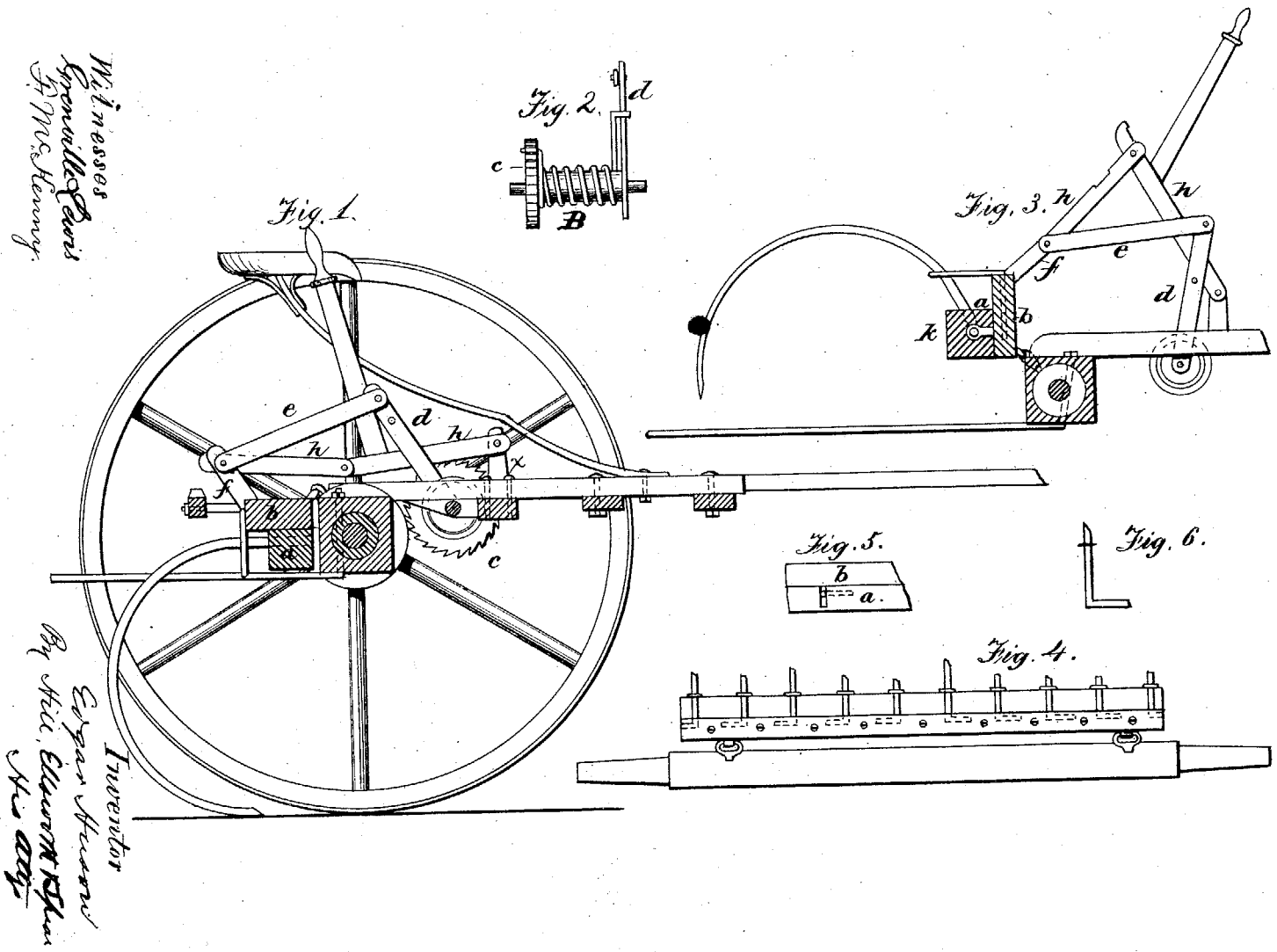
Witnesses
Grenville Lewis
F. McKenny.
Inventor
Edgar Huson
By Hill, Ellsworth & Spear
His Attys
THE GRAPHIC CO. N.Y.

UNITED STATES PATENT OFFICE.

EDGAR HUSON, OF ITHACA, NEW YORK, ASSIGNOR, BY MESNE ASSIGNMENTS, TO JOHN DODDS, AND JOHN W. STODDARD, AND JOHN DODDS & CO., OF DAYTON, OHIO.

IMPROVEMENT IN HORSE HAY-RAKES.

Specification forming part of Letters Patent No. 62,034, dated February 12, 1867; reissue No. 7,447, dated December 26, 1876; application filed July 26, 1876.

*To all whom it may concern:*

Be it known that I, EDGAR HUSON, of Ithaca, Tompkins county, New York, have invented an Improvement in Horse-Rakes; and I do hereby declare that the following is a full and exact description thereof, reference being had to the annexed drawings, and to the letters of reference marked thereon.

The first part of my invention consists in the combination of a spring, located in front of the axle of a wheeled hay-rake, with an arm or lever on the head, and suitable connections between the two, and also with the hand-lever by which the head is raised.

The second part of my invention relates to the construction of the tooth, and of the head, and the method of securing the tooth to the head.

Figure 1 of the drawing shows a side view of my improvements applied to a wheeled rake. Figs. 2, 3, 4, 5, and 6, are detached views of the different parts.

The spring (shown more clearly in Fig. 2) is represented as coiled upon a shaft hung in bearings in front of the axle. One end of the coiled spring is fixed to the ratchet-wheel *c* for adjustment of tension. The free end is connected to a lever, *d*, the lower end of which is pivoted on the shaft on which the spring is coiled, while the other end is joined by a bar, *e*, to a lever, *f*, fixed upon the rake-head.

It will be observed more clearly in Fig. 3 that the pressure of the spring is forward, and that the rake is lowered by its own weight and by the action of the jointed levers against the force of the spring. This force is exerted through the lever *d*, the rod, and the lever *f*, which connect it to the rake-head.

The jointed levers operate upon the rake-head, as shown in Figs. 1 and 3. They are marked *h h*. One is connected to the lever *f*, and the other, jointed thereto, is pivoted to a stud, *x*, on the cross-bar. The hand-lever is attached at a point convenient to the driver when in his seat, and by it he can raise the rake quickly and easily.

It will be observed in Fig. 1 that the joint of the levers, when the rake is down, is a trifle below the level of the outer ends of the lever. The rake is thus held down until the inner and jointed ends are raised through the hand-lever. The force applied by the driver and that exerted by the sp ing are both transmitted through these devices simultaneously to the lifting of the rake.

The object of the second part of the invention is to provide simple, cheap, and effective means for connecting the teeth to the rake-head, so as to admit of ready insertion and removal. To this end the teeth are bent at the upper end substantially at right angles, to form the pivot or hook by which they are attached to the head. This form of the tooth makes it practicable and easy to attach it to the head without any enlargement of the tooth itself, to hold it in place. The essential principle of this part of the invention consists in holding in place the tooth thus formed, and without upsetting or the use of nuts for this purpose, by means of the walls of the socket itself. In carrying out my invention I have formed in the head right-angled grooves or sockets for the pivots of the teeth. In one part of the said socket the bent portion of the tooth lies, and is, by the walls of this part, held against the draft. The part at right angles thereto, ordinarily made larger to allow some vertical motion, as required for the independent action of the teeth, holds said tooth from lateral displacement. In such sockets the teeth are easily placed, and from them as easily removed, it needing only some further means for holding the teeth in one direction, viz., that by which they were introduced. A ready and simple means for effecting this is by a strip, as shown at *b*. The part of the head in which are the sockets for the teeth is represented at *a*, and the strip *b* is fixed thereto. The object of this stop is simply to hold the teeth in place, the draft and any lateral motion being against the walls of the sockets, as before explained.

Upon the edge of *b* are fastened the loops, which serve to sustain the teeth, and limit the range of movement. The head is hinged to the axle in the ordinary manner, and all the other parts may be of ordinary construction.

I am aware that rake-teeth have been attached to a head, prior to my invention, by means of a portion bent at right angles, and permanently attached to castings, which castings were secured to the head. This construction prevents the ready application and removal, and which it is an object of my invention to secure.

What I claim as my invention, and desire to secure by Letters Patent, is—

1. The combination of the spring located in front of the rake-head with the lever *d*, and its connections with said head, and also with the hand-lever, whereby the spring is made to assist the driver in raising the head, as set forth.

2. The spring B, lever *d*, connecting-bar, and lever *f*, constructed and operating as set forth.

3. The bar *a* of the rake-head, made with recesses to receive the heads of the rake-teeth as set forth.

4. A rake-head composed of two parts, between which the ends of the teeth are clamped and held, as set forth.

5. The rake-head described, composed of the parts *a* and *b*, with recesses to hold the teeth, and loops to restrict the movement of the teeth, as set forth.

6. In a horse hay-rake, a tooth pivoted loosely in the socket by a portion of the end, bent substantially at right angles, and held against displacement by a stop fixed to, or forming a part of, said socket or head, as set forth.

7. In a horse hay-rake, the combination of a rake-tooth, having its upper end bent substantially at right angles to form a hook, by which it is pivoted in the socket, a socket the walls of which prevent the displacement of the hook in every direction but one, and a stop, independent of the tooth itself, to prevent displacement in such last-mentioned direction, as described.

8. In a horse hay-rake, the combination of a tooth having its end bent substantially at right angles to form a hook, by which it is held in the socket, and a socket, the walls of which form a right-angled bed or recess, in which the tooth is held, as described.

9. The combination of an oscillating rake-head, having sockets arranged at or near its front edge, with teeth having their upper ends bent substantially at right angles, to hold in the sockets, and with tooth-guides behind the sockets, as set forth.

EDGAR HUSON.

Witnesses:
R. INGERSOLL,
CLARENCE L. SMITH.